US009004599B2

(12) United States Patent
Collins et al.

(10) Patent No.: US 9,004,599 B2
(45) Date of Patent: Apr. 14, 2015

(54) SEAT MODULE FOR AN AIRCRAFT PASSENGER

(75) Inventors: Alexandra Collins, Geneva (CH); Mark Collins, Geneva (CH)

(73) Assignee: Airbus, Blagnac (FR)

( * ) Notice: Subject to any disclaimer, the term of this patent is extended or adjusted under 35 U.S.C. 154(b) by 554 days.

(21) Appl. No.: 13/056,788

(22) PCT Filed: Jul. 30, 2009

(86) PCT No.: PCT/FR2009/000959
§ 371 (c)(1),
(2), (4) Date: Apr. 26, 2011

(87) PCT Pub. No.: WO2010/012910
PCT Pub. Date: Feb. 4, 2010

(65) Prior Publication Data
US 2011/0186682 A1    Aug. 4, 2011

(30) Foreign Application Priority Data

Aug. 1, 2008    (FR) ..................... 08 55367

(51) Int. Cl.
 *B64D 11/06*    (2006.01)
(52) U.S. Cl.
 CPC ........ *B64D 11/06* (2013.01); *B64D 2011/0617* (2013.01); *B64D 2011/0658* (2013.01); *Y02T 50/46* (2013.01)
(58) Field of Classification Search
 USPC .......... 297/63, 112, 118, 232, 283.2, 354.13; 244/118.6, 122 R
 See application file for complete search history.

(56) References Cited

U.S. PATENT DOCUMENTS

| 3,171,684 | A  | * | 3/1965  | Carte ............................. 297/65     |
| 6,276,635 | B1 | * | 8/2001  | Ferry et al. ................. 244/118.6       |
| 6,352,309 | B1 | * | 3/2002  | Beroth ...................... 297/354.13       |
| 6,796,614 | B1 | * | 9/2004  | Paul ......................... 297/440.14      |
| 7,213,882 | B2 | * | 5/2007  | Dryburgh et al. ......... 297/354.13           |
| 7,360,742 | B2 | * | 4/2008  | Beroth ....................... 244/118.5       |
| 7,419,214 | B2 | * | 9/2008  | Plant ............................ 297/245     |
| 7,469,861 | B2 | * | 12/2008 | Ferry et al. ................. 244/118.6       |

(Continued)

FOREIGN PATENT DOCUMENTS

| CN | 2121371 U | 11/1992 |
| CN | 1461272 A | 12/2003 |

(Continued)

OTHER PUBLICATIONS

International Search Report issued Apr. 6. 2010 in PCT/FR09/00959 filed Jul. 30, 2009.

(Continued)

*Primary Examiner* — Peter Brown
(74) *Attorney, Agent, or Firm* — Oblon, McClelland, Maier & Neustadt, L.L.P.

(57) ABSTRACT

A seat module for an aircraft passenger includes a seat including a horizontal squab and a backrest, and a separation panel extending along at least one side of the seat. The seat is configured to move between a straight position, in which the backrest of the seat extends approximately vertically, and a reclined position, in which the backrest extends in a plane approximately perpendicular to the separation panel. The separation panel is lined, on a surface portion facing the seat, with a trim configured to form a surface on which the passenger may sit or lie.

17 Claims, 3 Drawing Sheets

(56) References Cited

U.S. PATENT DOCUMENTS

| | | | |
|---|---|---|---|
| 7,517,010 B2* | 4/2009 | Saint-Jalmes et al. | 297/118 |
| 8,011,723 B2* | 9/2011 | Park et al. | 297/118 |
| 2007/0164157 A1* | 7/2007 | Park | 244/118.6 |
| 2009/0146006 A1* | 6/2009 | Park et al. | 244/118.6 |

FOREIGN PATENT DOCUMENTS

| | | |
|---|---|---|
| CN | 1628043 A | 6/2005 |
| EP | 0869060 A1 | 10/1998 |
| EP | 1 602 526 | 12/2005 |
| FR | 2 904 805 | 2/2008 |
| JP | H10-236397 | 9/1998 |
| JP | 2008-520480 | 6/2008 |
| WO | WO 2005/014395 A1 | 2/2005 |
| WO | 2007 061381 | 5/2007 |

OTHER PUBLICATIONS

Notification of first Office Action issued Nov. 23, 2012 in Chinese Appln. 2009-80137141.5. (with English translation).

Chinese proceedings Text Portion of the Notification of the first Office Action of Dec. 5, 2012.

Office Action issued Aug. 6, 2013 in Japanese Application No. 2011-520553 (With English Translation).

\* cited by examiner

SEAT MODULE FOR AN AIRCRAFT PASSENGER

This invention relates to a seat module for an aircraft passenger and a separation panel for such a module.

It also relates to an aircraft comprising at least one such seat module.

On commercial aircraft flights, particularly in the classes known as higher (first class, "business" class, . . . ), the passengers are the object of special attention on the part of the aircraft manufacturers.

In particular, the passengers in the higher classes often have the possibility of tilting their seat in a more or less horizontal position, in order to convert their armchair into a bed.

In order to isolate the passengers from each other and to preserve a certain privacy among the passengers, it is known, in document FR 2 904 805, to propose a seat module in which a separation panel extends along at least one side of the seat in order to conceal the passenger occupying the seat from the eyes of the other passengers in the same aircraft cabin.

In such a seat module, the passenger may be either seated in the seat, the latter being in an upright position and the back of the seat extending in a vertical plane as the separation panel, or in a lying-down position, the seat having been converted into a bed and the back of the seat then extending more or less horizontally, in a plane more or less perpendicular to the separation panel.

The passenger thus may change position during travel in the aircraft, by alternating the position of the seat.

To change over from one position to the other, however, the passenger must manipulate the seat each time, to change over from the upright position of the seat to the extended position, and vice versa.

This invention has as a purpose to resolve the aforementioned drawbacks and to propose a more user-friendly seat module, allowing the passenger to change position without necessarily manipulating the seat.

To this end, this invention relates to a seat module for an aircraft passenger, consisting of a seat comprising a sitting surface and a back, and a separation panel extending along at least one side of the seat, the seat being movable between an upright position, in which the back of the seat extends more or less vertically, and an extended position, in which the back extends in a plane more or less perpendicular to the separation panel, the separation panel comprising a rear portion extending behind the back of the seat in the upright position.

According to the invention, a covering extends at least over the surface of the rear portion of the separation panel, the rear portion of the separation panel being adapted for forming a back for the passenger in the extended position of the seat.

In this way, the separation panel provided with a covering makes it possible to recreate a backrest when the seat of the module is in extended position, allowing the passenger to lean comfortably against this separation panel.

By virtue of the invention, the seat module offers the passenger three rest positions, a first seated position in the seat in upright position and an extended position and a second seated position when the seat is in extended position.

It will be noted in particular that when the seat has been manipulated into extended position, the passenger may alternate between the extended position and the seated position, without having to manipulate the seat each time.

Advantageously, the covering extends over the entire surface of the rear portion of the separation panel, to provide the passenger with a broad support surface when the seat is in extended position.

In the extended position, the back of the seat preferably forms a sitting surface.

The separation panel preferably forms a shell around the seat, further comprising two side portions extending respectively along the two sides of the sitting surface of the seat in the upright position.

This type of separation panel makes it possible to completely isolate the passenger from his environment in the cabin of the aircraft.

Moreover, the covering also extends over the surface of the side portions of the separation panel to provide the passenger with maximum comfort.

According to a second aspect, this invention also relates to a separation panel associated with a seat for an aircraft passenger, the said seat being movable between an upright position and an extended position.

According to the invention, the separation panel is provided, over a surface of a rear portion adapted for extending behind the back of the seat in the upright position, with a covering adapted for forming a support surface constituting a back for the passenger in the extended position of the seat.

According to a third aspect, this invention also relates to an aircraft comprising at least one seat module such as described above.

This separation panel and this aircraft have characteristics and advantages similar to those described above in connection with the seat module.

Other features and advantages of the invention also will become apparent in the description below.

In the attached drawings, presented by way of non-limitative examples:

First of all, an aircraft cabin layout according to an embodiment of the invention is going to be described with reference to FIG. 1.

Figure 1:
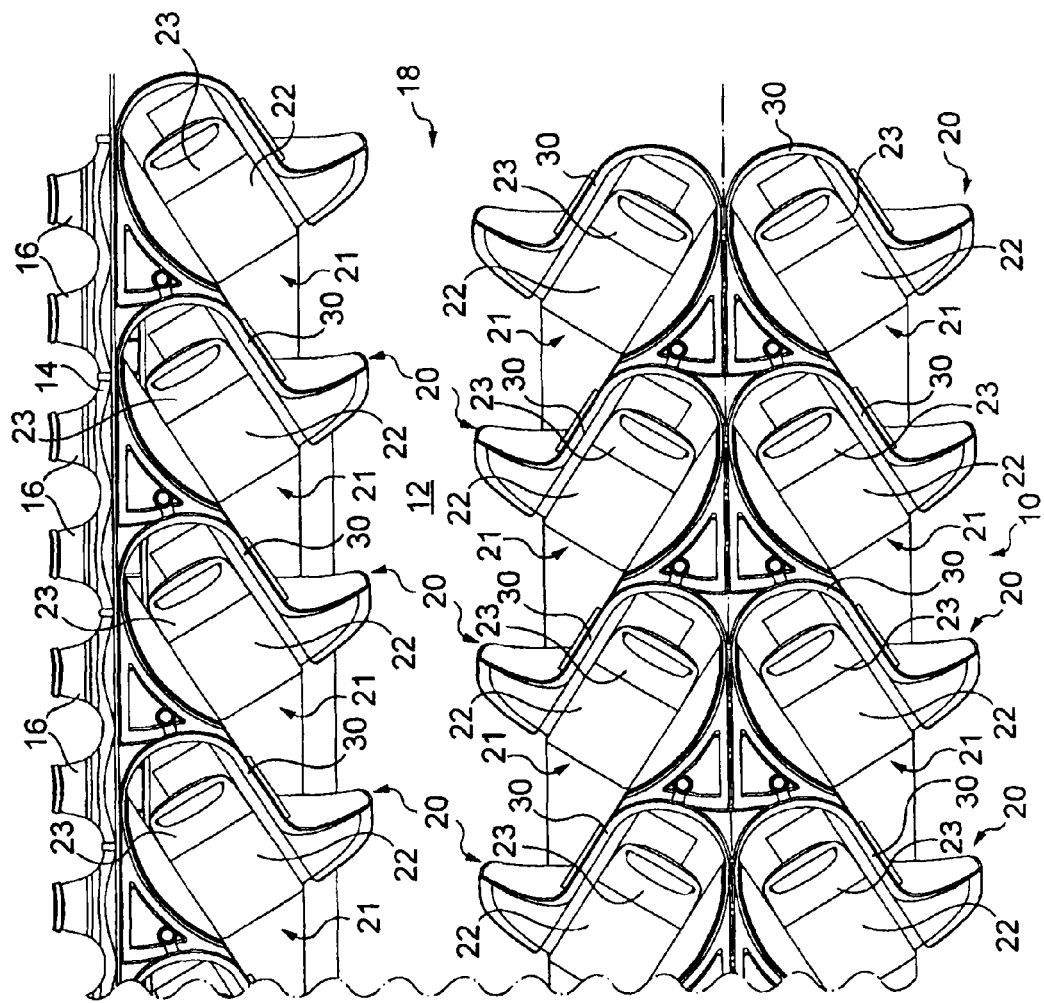
FIG. 1 is a schematic view from above of a set of seat modules with which a cabin of an aircraft is equipped.

As shown partially on FIG. 1, an aircraft cabin 10 comprises a floor 12, side walls, a single one 14 of which provided with windows 16 is shown, as well as a ceiling, not shown for reasons of clarity.

The cabin comprises several seat modules designated with the general reference 20 making it possible to create a seat for each passenger of the aircraft.

Each module 20 comprises a seat 21 and a separation panel 30.

As clearly illustrated on FIG. 1, different passenger seat modules are installed, namely modules 20 disposed along wall 14 of the cabin and modules 20 disposed in the central part of the cabin. In this central part, seat modules 20 are installed, for example, in pairs.

Between the central part of the cabin and wall 14 of the cabin, seat modules 20 are placed on both sides of an aisle 18, provided in the cabin for the movement of the passengers and the flight personnel.

Furthermore, as clearly illustrated on FIG. 1, seat modules 20 are arranged staggered in relation to each other, on both sides of aisle 18. This arrangement makes it possible to enhance the concealing effect produced by separation panels 30 as will be described below.

In each seat module 20, seat 21 itself comprises a sitting surface 22 and a back 23 allowing a passenger to be seated in seat 21 in standard manner.

On FIG. 1, each seat is in an upright position, back 23 of seat 21 thus extending more or less vertically in relation in particular to floor 12 of the aircraft.

Of course, this upright position of seat 21 also encompasses the intermediate positions of the seat in which back 23 is slightly tilted in relation to sitting surface 22, for example at an angle of 20 to 30° in relation to the vertical.

Figure 2A:
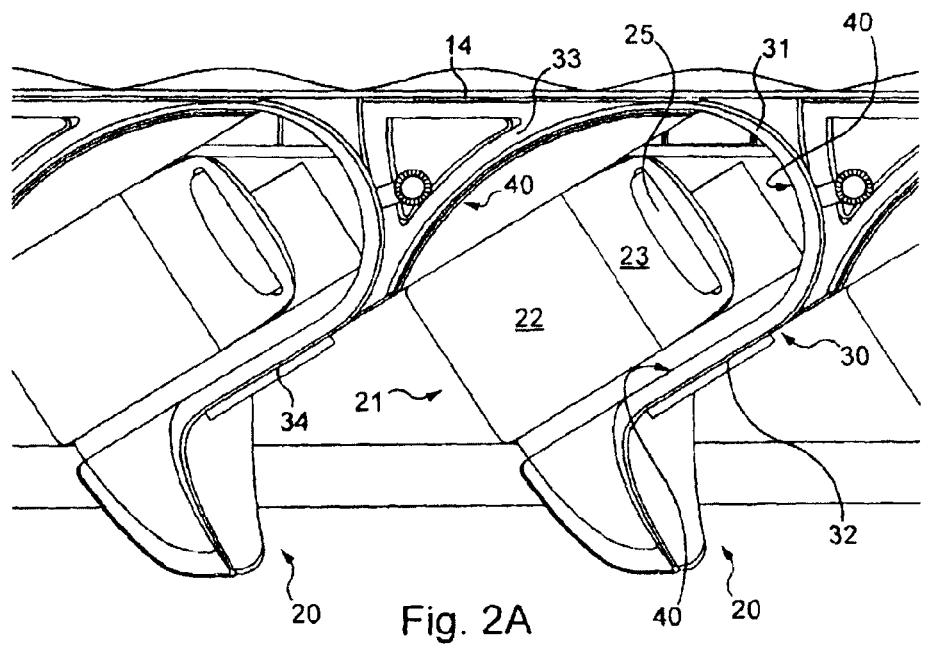
FIG. 2A illustrates a seat module in a view from above according to an embodiment of the invention, the seat being in upright position.
Figure 2B:
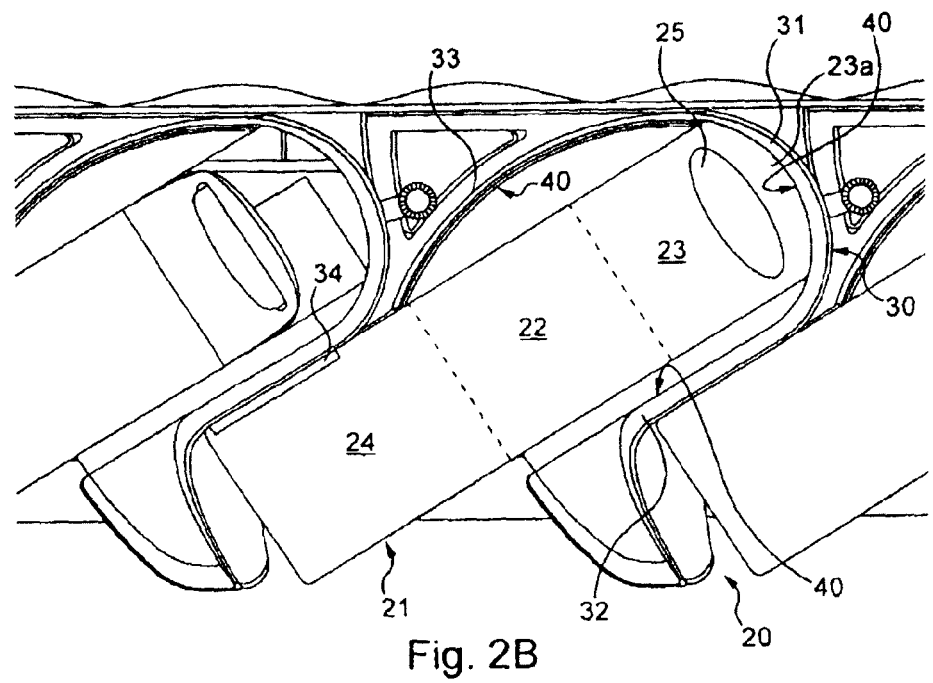
FIG. 2B is a view similar to FIG. 2A, the seat being in extended position.

FIGS. 2A and 2B illustrate a seat module 20 in greater detail, each seat 21 being movable between an upright position (FIG. 2A) and an extended position (FIG. 2B).

The mechanism allowing seat 21 to change over from the upright position to the extended position, and vice versa, is not illustrated on the Figures. This mechanism may be any mechanism at all, well known to the individual skilled in the art, making it possible to change the position of the seat.

In particular, in the extended position, back 23 of seat 21 extends in a more or less horizontal position, more or less in the same plane as sitting surface 22 of the seat.

As clearly illustrated on FIGS. 2A and 2B, back 23 preferably comprises a headrest 25 constituting a pillow for the passenger's head when the seat 21 is in extended position.

Seat 21 in extended position, such as illustrated on FIG. 2B, thus constitutes a bed for the passenger.

In order to increase the length of this bed, seat 21 may further comprise a wing 24 in the continuation of sitting surface 22, adapted for moving between a more or less vertically folded-back position, when seat 21 is in upright position, and a position extended more or less in the same horizontal plane as sitting surface 22 and back 23 of seat 21 when the latter is in extended position.

Figure 3:
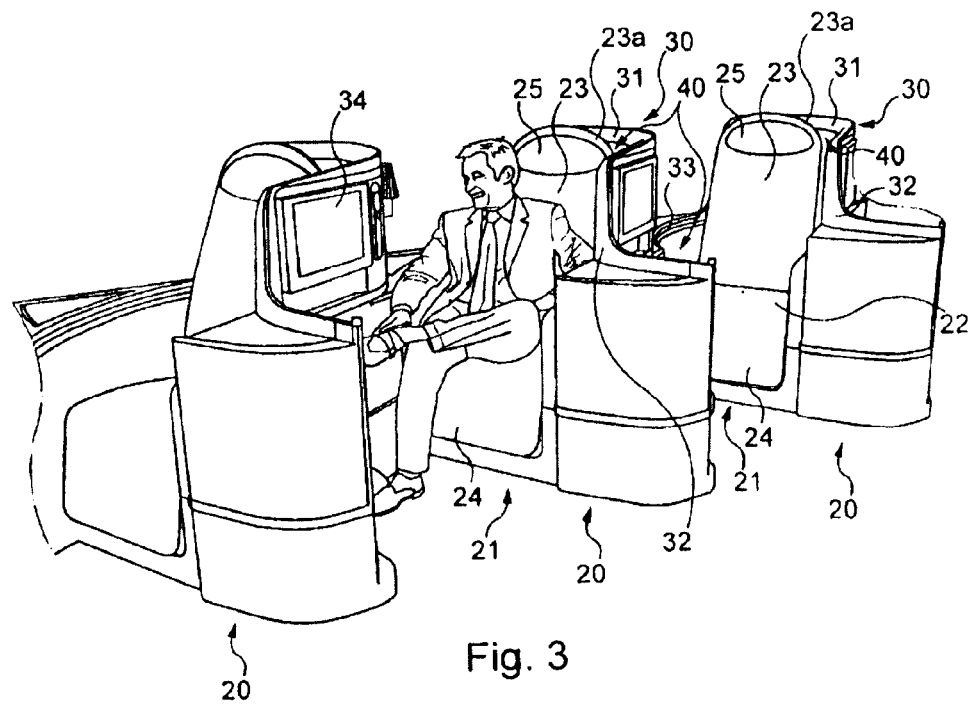
FIG. 3 is a perspective view of a seat module according to an embodiment of the invention, illustrating a first position of the passenger occupying such a seat module.
Figure 4:
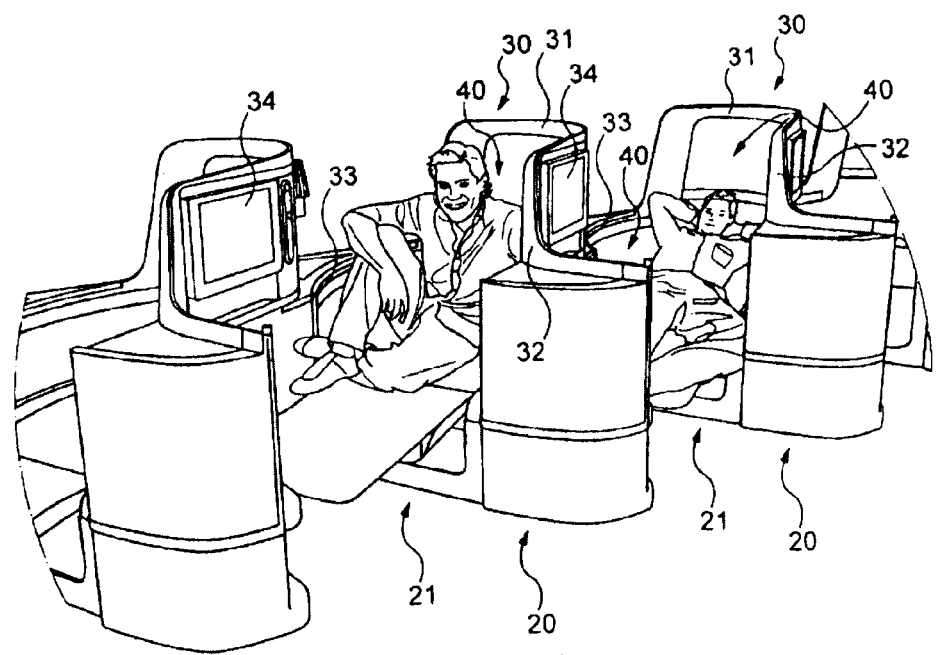
FIG. 4 is a view similar to FIG. 3 illustrating two other positions of the passenger in the seat module according to the invention.

As clearly illustrated on FIGS. 3 and 4, each separation panel 30 extends at least along one side of seat 21, so as to wholly or partially conceal a passenger occupying seat 21.

Each separation panel 30 thus is non-transparent and preferably made of molded plastic or thermally molded composite material.

In this preferred embodiment, each separation panel 30 forms a shell extending around seat 21, and in particular along two sides of sitting surface 22 and behind back 23 of seat 21, when the latter is in upright position.

Separation panel 30 thus has a surface directed toward seat 21 which has a curvature with a cavity directed toward the seat.

As clearly illustrated on the view from above of FIGS. 2A and 2B, separation panel 30 has a more or less semicircular shape around seat 21.

In order to preserve the privacy of the passenger seated or lying down in seat 21, this separation panel 30 has, at least over a part of its circumference, a height sufficient to conceal the passenger seated or lying down in seat 21.

In this embodiment, separation panel 30 has a rear portion 31 intended to extend behind back 23 of seat 21 when this back 22 is in more or less vertical position, with considerable height and for example, by way of non-limitative example, with a height of 1 m30.

One of side portions 32 extending along one side of sitting surface 22, and in the example of FIGS. 3 and 4, to the left of the passenger when the latter is seated in seat 21, also has a sufficient height, of the same order of magnitude as that described above for rear portion 31 of separation panel 30.

This first side portion 32 and rear portion 31 of separation panel 30 are intended to separate seat 21 from the adjacent seats, here disposed in alignment, along wall 14 of the aircraft.

First side portion 32 also is intended to conceal the passenger from the occupants of the seats on the other side of aisle 18 of the cabin.

As explained above, the staggered arrangement of the seats on both sides of this aisle 18 also favors the privacy of each passenger, isolated by separation wall 30, and in particular by first side portion 32.

Purely by way of illustration, this first side portion 32 may comprise on its outer surface, opposite seat 21 of the seat module considered, a screen 34 turned toward a passenger in an adjacent seat module, placed at the rear of the seat module considered.

Finally, separation panel 30 comprises a second side portion 33 intended, in the exemplary embodiment illustrated on FIGS. 3 and 4, to be disposed to the right of the passenger when the latter is seated in seat 21.

In this embodiment, this second side portion 33 of separation panel 30 is of lesser height, and for example approximately 80 cm, forming an armrest and/or a shelf for the passenger in seat 21.

As clearly illustrated on FIGS. 3 and 4, the passenger may occupy a seated position, illustrated on FIG. 3, and a lying-down position, illustrated on FIG. 4, on seat module 20 to the right of this Figure.

Furthermore, separation panel 30 is provided, over at least a surface portion directed toward seat 21, with a covering 40 adapted for forming a support surface for the passenger.

In this way, as clearly illustrated on FIG. 4, when seat 21 is in extended position, the passenger may lean comfortably against separation panel 30 provided with a covering 40 (see seat module to the left of FIG. 4).

Thus, in the extended position, back 23 of seat 21 forms a sitting surface and separation panel 30 provided with covering 40 forms a back for the passenger.

As clearly illustrated on FIGS. 2A and 2B, the arrangement of seat 21 in the seat module, and its positioning in relation to separation panel 30 makes it possible, when seat 21 is in extended position, to achieve a positioning of back 23 of seat 21 more or less perpendicular to separation panel 30.

As clearly illustrated on FIG. 2B, an upper edge 23a of back 23 of seat 21 is adapted for coming into position more or less adjacent to separation panel 30.

In this embodiment, upper edge 23a of back 23 of seat 21 is adapted for coming more or less into contact with rear portion 31 of separation panel 30, when back 23 is in horizontal position.

Upper edge 23a of back 23 and rear portion 31 of separation panel 30 thus have complementary forms.

Here, the arc contour of upper edge 23a of back 23 corresponds more or less to the concave form of rear portion 31 of separation panel 30.

This rear portion 31 of separation panel 30 has a surface portion, provided with covering 40, the concavity of which is directed toward seat 21, and more particularly around upper edge 23a of back 23 of seat 21 in extended position.

As clearly illustrated on FIG. 4, covering 40 extends over the surface of rear portion 31 of separation panel 30, and preferably over the entirety of this surface.

This covering 40 also preferably extends over the concave surface portions of side portions 32, 33 of separation panel 30, directed facing the sides of sitting surface 22 of seat 21.

In order to provide the passenger with a comfortable support, this covering 40 of separation panel 30 may consist of a thin, padded, cushion-type upholstering. By way of indication, this upholstering may have a thickness ranging between 1 and 5 cm, and preferably between 2 and 3 cm.

This covering 40 consists, for example, of a composite upholstering, comprising an inner layer intended to be fastened, for example by gluing, against the surface of separation panel 30. This inner layer may have a certain thickness and elasticity. This inner layer typically may be a foam made of plastic.

An outer layer, held for example by stitching on the inner layer, may be made of woven or non-woven textile, in a material adapted for ensuring the comfort of the passenger leaning against separation panel 30.

Covering 40 preferably is made of a fire-resistant material.

By virtue of the invention, separation panel 30 has, in addition to its function of separation and isolation of the passenger, a function as an additional back, allowing the passenger to occupy a comfortable seated position even when seat 21 is in extended position.

This separation panel 30 of semi-circular shape, surrounding seat 21 and provided with a covering 40, thus forms an alcove around seat 21.

Of course, numerous modifications may be made to the exemplary embodiments described above without departing from the context of the invention.

In particular, the arrangement of covering 40 on separation panel 30, and especially on the surfaces intended to come around seat 21 when the latter is in extended position, is in no way limitative.

Furthermore, the thickness of covering 40 may be variable according to the different surface portions of separation panel 30. In particular, the thickness of this covering may be greater over rear portion 31 of separation panel 30, against which the passenger naturally is led to lean when he wishes to be in seated position on the seat in extended position. On the other hand, in order to reduce material costs and the weight of the module, the covering fastened over side portions 32, 33 of separation panel 30 may be of lesser thickness.

The invention claimed is:

1. A seat module for an aircraft passenger, comprising:
a seat including a first sitting surface and a back;
a separation panel extending along at least one side of the seat, the seat being movable between an upright position, in which the back of the seat extends more or less vertically, and an extended position, in which the back extends in a plane more or less perpendicular to the separation panel, the separation panel comprising a rear portion extending behind the back of the seat in the upright position; and
a covering that extends at least over a surface of the rear portion of the separation panel, wherein
the rear portion of the separation panel forms a back for the passenger in the extended position of the seat,
the back of the seat is movable towards the separation panel to form a second sitting surface in the extended position,
the separation panel comprises a first side portion extending laterally from the rear portion along the first sitting surface, with a same height as the rear portion, the first side portion including a front vertical section extending continuously downward, in a direction perpendicular to a floor, to at least a plane of the first sitting surface,
the front vertical section of the first side portion is forward of a joint between the first sitting surface and the back of the seat, and
the covering further extends over a surface of the first side portion, and a thickness of the covering over the rear portion of the separation panel is greater than a thickness of the covering over the first side portion of the separation panel.

2. The seat module according to claim 1, wherein the covering extends over an entire surface of the rear portion of the separation panel.

3. The seat module according to claim 1, wherein the separation panel forms a shell around the seat, and further comprising two side portions extending respectively along two sides of the first sitting surface.

4. The seat module according to claim 3, wherein the covering further extends over a surface of the two side portions of the separation panel.

5. The seat module according to claim 4, wherein a thickness of the covering of the rear portion of the separation panel is greater than a thickness of the covering of the two side portions of the separation panel.

6. The seat module according to claim 1, wherein the rear portion of the separation panel has a curvature having a concavity directed toward the seat.

7. The seat module according to claim 1, wherein the covering is a composite upholstering.

8. The seat module according to claim 1, wherein the covering comprises an inner layer made of plastic foam and an outer layer made of textile.

9. An aircraft, comprising at least one seat module according to claim 1.

10. The seat module according to claim 1, wherein an upper edge of the back and the rear portion of the separation panel have complementary forms.

11. The seat module according to claim 10, wherein the upper edge of the back corresponds to a concave form of the rear portion of the separation panel.

12. The seat module according to claim 11, wherein the concave form is semi-circular.

13. The seat module according to claim 1, wherein the seat further includes a wing, the wing being stored in a more or less vertically folded-back position in the upright position,
wherein the wing is movable upwards to a same horizontal plane as the first sitting surface in the extended position.

14. The seat module according to claim 1, wherein the covering is a padded, cushion-type upholstering.

15. The seat module according to claim 14, wherein the padded, cushion-type upholstering includes foam glued to a surface of the separation panel.

16. The seat module according to claim 14, wherein a thickness of the cushion-type upholstering is between 1 to 5 cm.

17. A separation panel associated with a seat for an aircraft passenger, the seat being movable between an upright position and an extended position,
wherein the separation panel extends along at least one side of the seat,
wherein the separation panel is provided, over a surface of a rear portion adapted for extending behind a back of the seat in the upright position, with a rear covering to form a support surface constituting a back for the passenger in the extended position of the seat,
wherein the seat includes a seatback, the seatback being moved towards the separation panel in the extended position to form a sitting surface that is more or less perpendicular to the separation panel,
wherein the separation panel extending along at least one side of the seat is a first side portion that extends laterally from the rear portion along the seat, with a same height as the rear portion, the first side portion including a front vertical section extending continuously downward, in a direction perpendicular to a floor, to at least a plane of the sitting surface, and a side covering extends over a surface of the first side portion, a thickness of the rear covering being greater than a thickness of the side covering, and wherein the front vertical section of the first side portion is forward of a joint of the seatback of the seat.

\* \* \* \* \*